United States Patent [19]

Sorg et al.

[11] Patent Number: 5,370,094
[45] Date of Patent: Dec. 6, 1994

[54] ARRANGEMENT FOR CONTROLLING AN INTERNAL COMBUSTION ENGINE

[75] Inventors: Dieter Sorg, Gemmingen; Martin Streib, Vaihingen/Enz, both of Germany

[73] Assignee: Robert Bosch GmbH, Stuttgart, Germany

[21] Appl. No.: 117,296

[22] Filed: Sep. 7, 1993

[30] Foreign Application Priority Data

Sep. 5, 1992 [DE] Germany .............................. 4229774

[51] Int. Cl.$^5$ ...................... F02D 41/22; F02D 45/00
[52] U.S. Cl. .................................................. 123/399
[58] Field of Search ..................... 123/396, 399, 361

[56] References Cited

U.S. PATENT DOCUMENTS

| | | | |
|---|---|---|---|
| 4,854,283 | 8/1989 | Kiyono et al. | 123/399 X |
| 5,018,383 | 5/1991 | Togai et al. | 73/118.1 |
| 5,048,482 | 9/1991 | Kratt et al. | 123/399 X |
| 5,079,946 | 1/1992 | Motamedi et al. | 73/118.1 |
| 5,092,298 | 3/1992 | Suzuki et al. | 123/399 X |
| 5,235,951 | 8/1993 | Taguchi et al. | 123/399 X |

FOREIGN PATENT DOCUMENTS

| | | |
|---|---|---|
| 0308392 | 3/1989 | European Pat. Off. . |
| 3631200 | 3/1988 | Germany . |
| 61-58945 | 3/1986 | Japan . |
| 2228803 | 9/1990 | United Kingdom . |

*Primary Examiner*—Willis R. Wolfe
*Attorney, Agent, or Firm*—Walter Ottesen

[57] ABSTRACT

The invention is directed to an arrangement for controlling an internal combustion engine wherein one or more position data values are determined with reference to the position of the adjusting device via a plausibility check with a signal value representing the load of the engine. If required, an emergency operation takes place in the context of an electronic engine power control with position data values which are unreliable and on the basis of a desired value, which is pregiven by the driver and which represents the load of the engine, and a corresponding actual value.

9 Claims, 4 Drawing Sheets

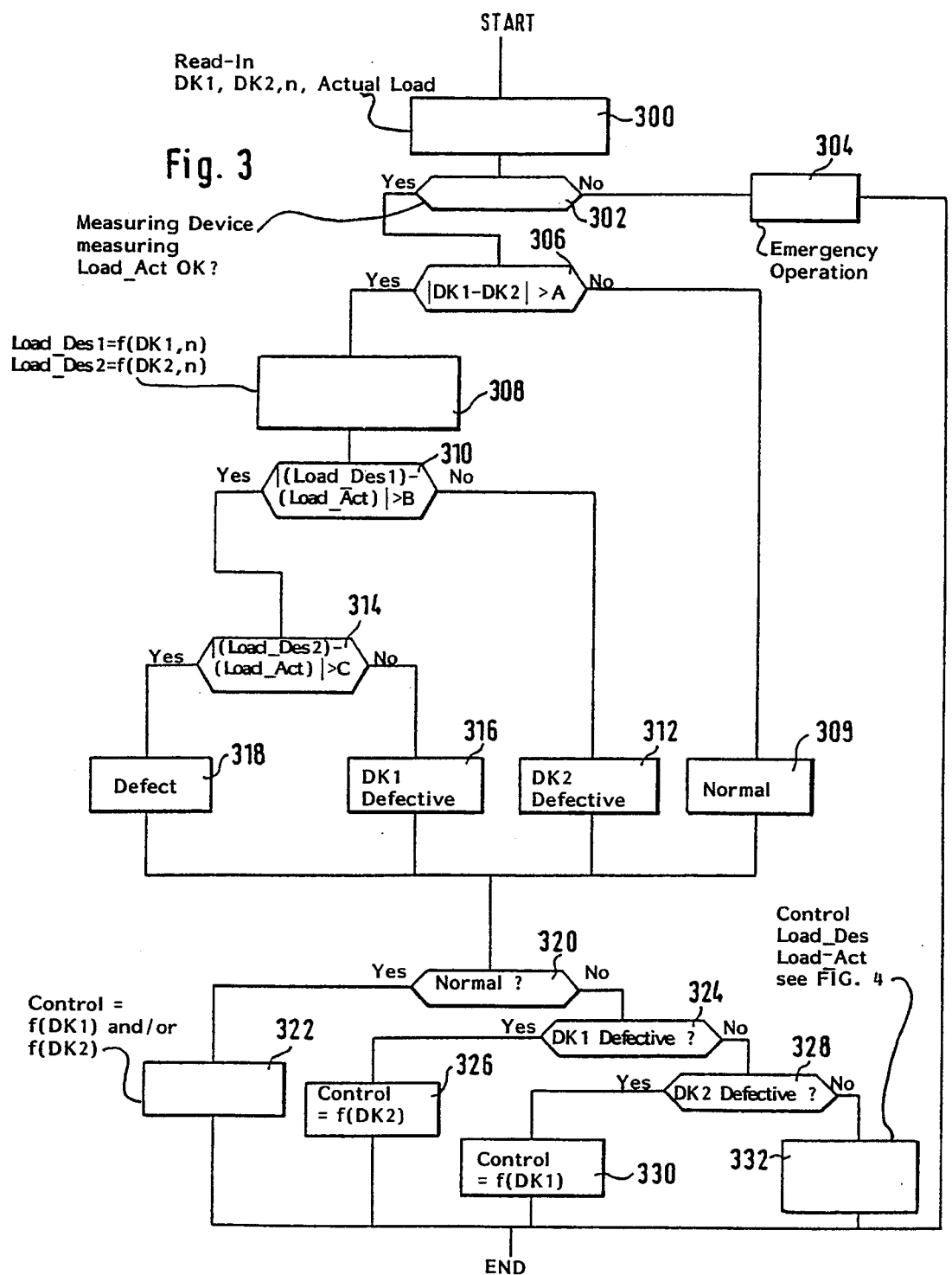

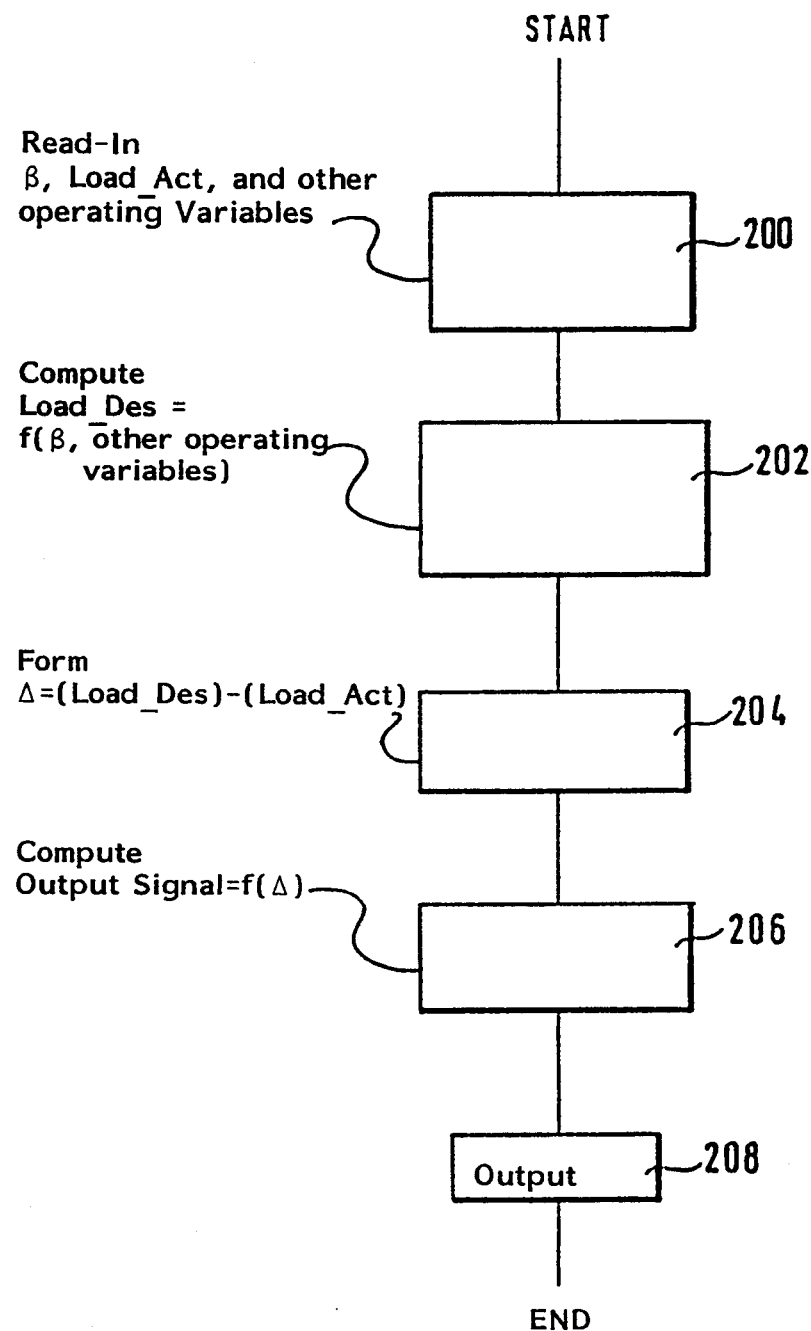

ARRANGEMENT FOR CONTROLLING AN INTERNAL COMBUSTION ENGINE

FIELD OF THE INVENTION

The invention relates to an arrangement for controlling an internal combustion engine having at least one electrically-actuable positioning element for controlling an adjusting device. The adjustment takes place in dependence upon the position of a driver-actuable element and the arrangement includes at least one measuring device for detecting the position of the adjusting device and at least one measuring device for detecting a variable representing a measure for the load of the engine. This variable is not directly related to the position of the adjusting device.

BACKGROUND OF THE INVENTION

In modern control systems for internal combustion engines, measuring devices are often used for detecting operating variables of the internal combustion engine or of the motor vehicle. The measuring signals of the measuring devices define the basis for the control of the engine. Unwanted operating conditions of the engine are a result of malfunctions in the area of the measuring devices. For this reason, these measuring devices must be monitored as to their operability. Such a monitoring has special significance for electronic engine power control systems (electronic accelerator-pedal systems) wherein the power of the engine and therefore the speed of the motor vehicle is controlled. This control is achieved on the basis of measuring signals from position transducers for a driver-controlled element and, if required, for a power positioning element. Therefore, in the past, various measures for monitoring such a position transducer have been suggested. For example, it is known from U.S. Pat. No. 5,320,076, to provide three position transducers in combination with a power positioning element with the measuring signals of the position transducers being checked with respect to each other as to plausibility and, in the event of a fault, one of the measuring devices controls the internal combustion engine on the basis of the two measuring devices which remain operational in the sense of a two-out-of-three selection. Such a procedure could, however, hardly be satisfactory in several embodiments when viewed in the context of its complexity.

SUMMARY OF THE INVENTION

In view of the foregoing, it is an object of the invention to provide measures with which position transducers for an internal combustion engine can be monitored in a simple manner with the availability of a suitable emergency operation being desirable.

The foregoing is realized in that two signal values based on two pieces of position data and at least one signal value, which represents a measure for the engine load independently of this position information, are provided and a fault is detected when at least two of these signal values depart impermissibly from each other. As a rule, two signal values remain free of defect on the basis of which the engine can be controlled.

The above fault case can occur in an electronic engine power control system wherein a power-determining element is set in dependence upon the driver's command. Also, in the case that in such a system, simply a first signal value, which is based on a position data value and a second signal value, which represents a measure of the engine load, independent of this position data value, can be applied for fault checking. In these situations, a second aspect of the invention becomes important according to which a fault is detected when the two signal values depart from each other to an impermissible extent.

A further aspect of the invention is seen in that in this fault situation or, when no reliable position data value is present, an emergency operation of the electronic engine power control system is initiated in such a manner that the driver command defines a variable which represents a measure for the engine load independently of the position data value and the signal value representing this variable is adjusted to the pregiven desired value in the sense of a closed-loop control.

The abstract of JP61-58945 discloses to draw a conclusion as to abnormalities of the air-flow sensor on the basis of a measurement signal of an air-flow meter and on the basis of the measurement signal for the throttle flap position of an internal combustion engine and to initiate emergency measures in the case of a fault.

The procedure provided by the invention for monitoring faults of a position-measuring device makes possible a fault monitoring on the basis of at least one position data value.

A two-out-of-three selection on the basis of two position data values is especially advantageous. A third position transducer becomes unnecessary and, in the case of a fault, the open-loop control of the internal combustion engine is continued on the basis of two values which remain valid with respect to operation.

The procedure provided by the invention affords the advantage in the context of an electronic engine power control that the operational safety is guaranteed without being limited by saving the third position transducer or by using only one position transducer or one position data value and the availability for operation is ensured while at the same time reducing complexity.

The procedure provided by the invention affords the possibility to undertake an emergency operation operating with virtually the full scope of function of the electronic engine power control without an operational position transducer.

Special advantages result when utilizing a step motor for which position data is available by counting the outputted steps so that only a position sensor must be provided for monitoring safety or for the closed-loop control in combination with the power positioning element.

An emergency operation without functional limitations can be carried out in the case of a fault by means of the two-out-of-three selection made possible by the procedure of the invention when there is implausibility between the compared signals. The procedure of the invention gains special significance with an implausible step-counter count which can then be synchronized on the basis of two other values.

The use of the signal value of the load-detecting element is especially advantageous for detecting engine load independently of the position data such as from an air-flow sensor, air-mass sensor or intake pressure sensor or of the injection fuel signal (load signal) $T_l$. The signal value is anyway provided by the engine-control system.

BRIEF DESCRIPTION OF THE DRAWINGS

The invention will now be described with reference to the drawings wherein:

FIG. 3, on the other hand, is a flowchart which shows at least two position transducers being compared to each other by means of a plausibility comparison and by means of a comparison to a load value; and, FIG. 4 is a flowchart for carrying out an emergency operation of an electronic engine power control system where position information has become unavailable.

DESCRIPTION OF THE PREFERRED EMBODIMENTS OF THE INVENTION

Figure 1:
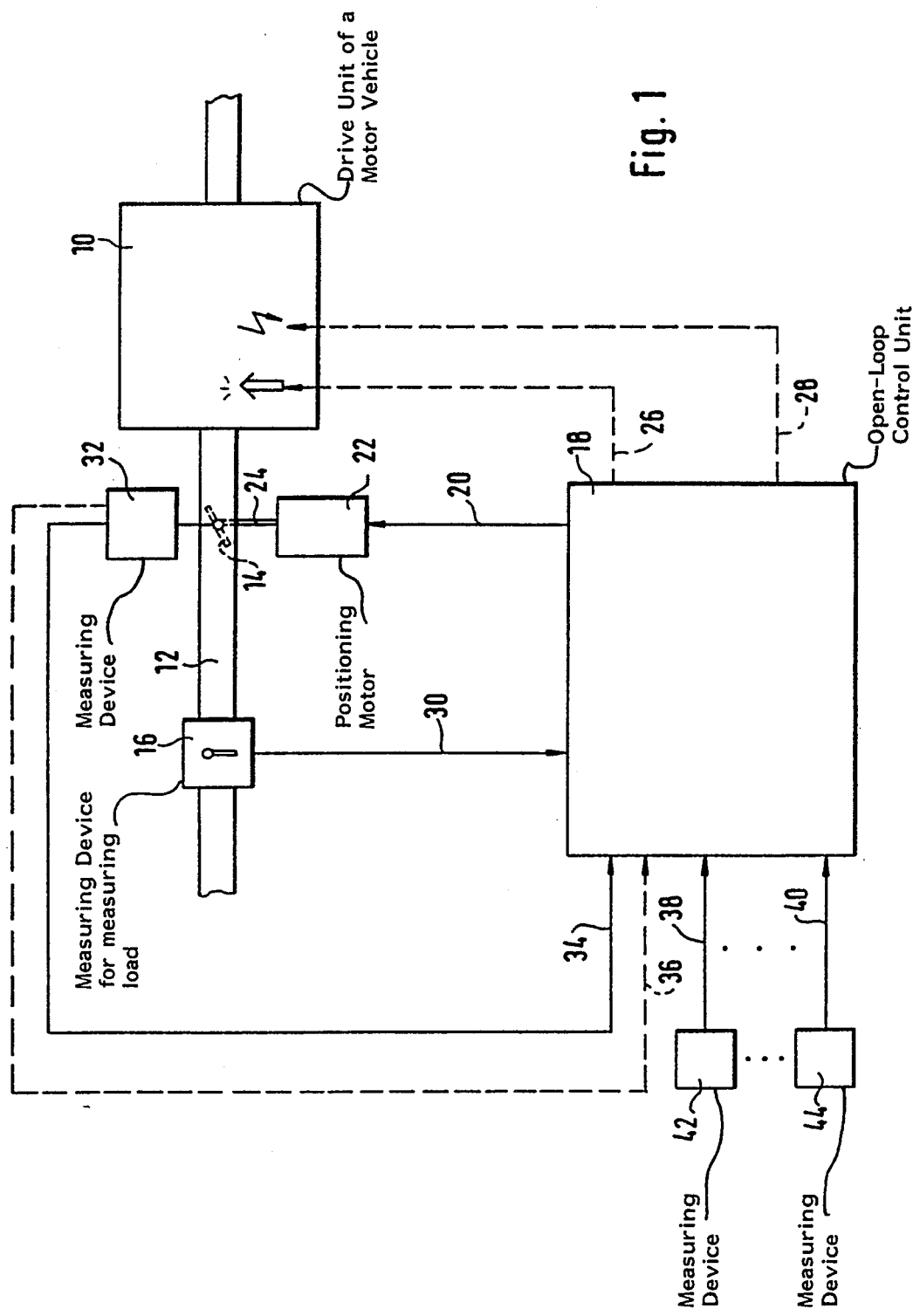
FIG. 1 is an overview block circuit diagram of an engine control system wherein the procedure provided by the invention is utilized.

FIG. 1 shows a drive unit 10 of a motor vehicle which has an air-intake system 12 in which a throttle flap 14 as well as a measuring device 16 for detecting load are mounted. In addition, a control unit 18 is provided which, in a preferred embodiment, actuates an electronic position motor 22 via a first output line 20. The positioning motor 22 is connected via a mechanical connection 24 to the throttle flap 14. In a preferred embodiment, additional output lines 26 and 28 are provided which are shown as dashed lines in FIG. 1 and which control fuel metering and ignition time-point adjustment.

The control unit 18 includes the following input lines. A first input line 30 connects the control unit 18 to the measuring device 16 for detecting load. A measuring device 32 is provided which is mounted on the throttle flap 14 or on the mechanical connection 24 and detects the position of the throttle flap. A second input line 34 of the control unit 18 connects the control unit to the measuring device 32. In a preferred embodiment, the measuring device 32 is a double position transducer which generates two signal values representing the position of the throttle flap 14. For this reason, a further input line 36 of the control unit 18 is shown as a dashed line which connects the control unit to the measuring device 32. Input lines 38 to 40 are provided which connect the control unit 18 to measuring devices 42 to 44, respectively, for detecting other operating variables of the drive unit 10 or of the motor vehicle.

In a preferred embodiment, the system shown in FIG. 1 is an engine control system wherein at least fuel injection and throttle-flap position are electronically controlled. As generally known, a base injection signal $T_1$ (load signal) is formed on the basis of the variable representing the engine load and detected by measuring device 16 as well as on the basis of the engine speed detected by one of the measuring devices 42 to 44. The quantity of fuel to be metered is determined on the basis of this base injection signal while considering different correctives such as with respect to exhaust-gas composition, elevation above sea level and the like and at least one injection valve is actuated. Furthermore, a desired value for the position of the throttle flap 14 is determined on the basis of the position of a driver-actuated element which is detected by one of the measuring devices 42 to 44. Then, in other preferred embodiments, additional operating variables can be formed such as engine temperature, battery voltage, engine speed, motor-vehicle road speed, drive-slip control intervention signals and the like. These operating variables are especially significant with respect to operating states outside of the actual operation such as idle operation, start, drive-slip control and the like. A drive signal supplied via the output line 20 is then formed in the control unit 18 on the basis of this desired value and, if necessary, while considering one of the measurement signals representing the position of the throttle flap. The throttle flap 14 is then actuated in the sense of an adjustment of the pregiven desired position.

The position motor 22 can be a direct-current motor; however, in a preferred embodiment, the position motor 22 is a step motor for which a step counter detects the outputted steps and for which a first position data value with reference to the throttle flap 14 is present. Accordingly, the measuring device 32 can be omitted in one preferred embodiment or, in another embodiment, the measuring device 32 only needs to include a position transducer for making a second position data value available.

The measuring device 16 can, in dependence upon the embodiment, be an air-quantity sensor, an air-mass sensor or an intake-pipe pressure sensor.

The procedure according to the invention described below can also be applied in an advantageous manner to engine control systems without an electrical actuation of the throttle flap. In such systems, the throttle flap position serves to detect idle, to detect load in a component range or to detect an acceleration command of the driver to trigger the enrichment for acceleration.

The procedure of the invention for checking the position detection of the throttle flap is described in the following with respect to FIGS. 2 to 4.

Figure 2:
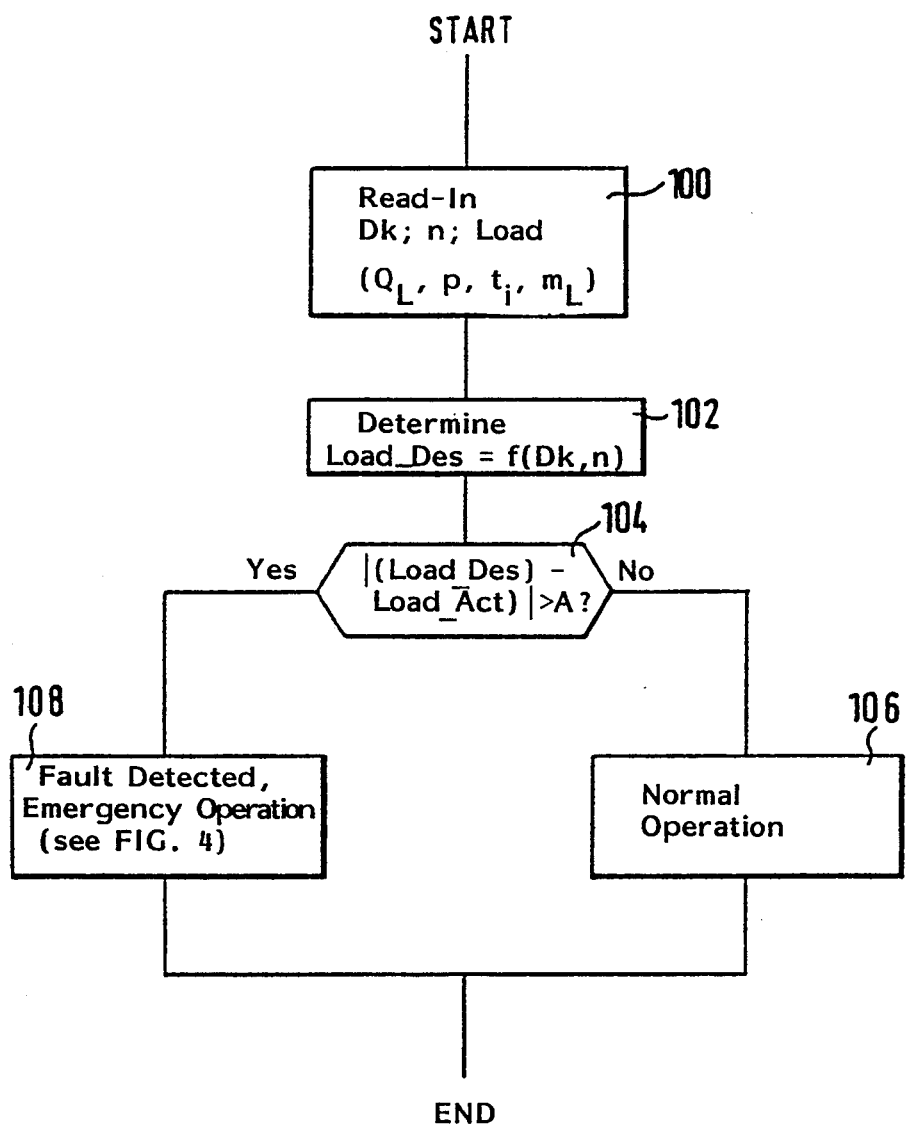
FIG. 2 is a flowchart which shows the monitoring of an individual position transducer by means of a plausibility comparison to a load value.

In FIG. 2, a monitoring of the measuring device 32 for one embodiment is shown in which only a position data value of the measuring device 32 is provided. For a step motor, the measuring device 32 is understood to be a step counter. The procedure shown in FIG. 2 is only initiated when the measuring device 16 operates correctly. An operational check of the measuring device 16 is carried out in a manner known per se.

After the subprogram shown in FIG. 2 is started, the following are read-in in step 100: the measured value of the measuring device 32 (DK), the engine speed (n) and the measured value of the load-measuring device 16 (air quantity $Q_L$, intake-pipe pressure P, air mass $M_L$ or the base injection quantity $T_1$ formed by the quotient of the air quantity or air mass and engine speed). For the description of a preferred embodiment which follows, the air mass is referred to as the variable representing a measure of the engine load but this description does not exclude other possible measuring signals which can be utilized.

In the next step 102, a desired value for the air mass drawn in by suction is determined on the basis of the measured value of the measuring device 32 and the engine speed from a characteristic field. In the following inquiry step 104, the amount of the difference between this determined desired value and the actual value of the air-mass flow detected by the measuring device 16 is checked with respect to a pregiven tolerance range. If the amount of this difference is less than a pregiven value A then, according to step 106, normal operation is determined (that is, the fault-free operation of the measuring device 32); whereas, in the opposite case, according to step 108, a fault condition of the measuring device 32 is detected and an emergency operation is initiated. The subprogram is terminated after steps 106 and 108 and repeated at pregiven time points.

If a step motor is used as the drive then, in the case of the implausibility, an emergency operation can even be avoided by means of a new synchronization of the step counter with a correctly operating load-detection device. For this purpose, the throttle flap is driven to a defined point in step 108, for example, to an end position or another specific point of the actuating range (for example, the instantaneous reversal point of the actuator) and the step counter is set to the corresponding value. Monitoring by means of the load-measuring variable serves to satisfy the safety requirements.

In another embodiment, a comparison of position measurement values can be carried out in lieu of the comparison of air-mass values. Then, a position desired value for the throttle flap is determined on the basis of the detected air-mass flow value and the engine speed and the deviation between this desired value and the actual value detected by the measuring device 32 is checked as to a pregiven tolerance range.

In the preferred embodiment of a motor-control system wherein the throttle flap is actuated by electrical means, an emergency operation is initiated in the step 108 as shown in FIG. 4.

After the start of the subprogram shown in FIG. 4, the accelerator-pedal position $\beta$ and the measured value detected by the measuring device 16 are read-in in a first step 200 in addition to other operating variables such as road speed, engine speed, battery voltage, ASR intervention signals, et cetera. In the next step 202, an air-mass flow desired value is determined on the basis of the accelerator-pedal position and, if necessary, on further operating variables from a characteristic field. In step 204, the difference $\Delta$ is formed from the determined desired value and the actual value of the air-mass flow, which is detected by the measuring device 16, and, in step 206, the output signal is determined on the basis of the control deviation $\Delta$, for example, by means of a pregiven controller equation having, for example, a PID response. In step 208, the computed output signal value is emitted to the position motor 22 via the line 20.

The described emergency operation accordingly defines a control of the air-mass flow, which is influenced by the throttle flap 14, in lieu of that air-mass flow value for open-loop control or closed-loop control of the position of the throttle flap 14 with the control being carried out with a correct function of the measuring device 32. In other advantageous embodiments, the emergency operation can be carried out also on the basis of the other load values such as air quantity, air-intake pressure or the load signal itself by means of the control loop described.

FIG. 3 shows the monitoring of the measuring device 32 for a preferred embodiment for which two position values with respect to the throttle flap 14 are provided. These position data values can, on the one hand, come from two position transducers such as shown in FIG. 1 or, on the other hand, from a position transducer and from a step counter (while utilizing a step motor as drive) for the outputted steps.

In a first step 300, the variables used in the subsequent check are read in. These variables are a first position data value (DK1) from the measuring device 32, a second position data value (DK2), which either originates from the measuring device 32 or from a step counter, the engine speed (n) as well as the measured value representing the load of the engine detected by the measuring device 16.

In a following inquiry step 302, a check is made as to whether the measuring device 16 operates correctly. If this is not the case, then, according to step 304, an emergency operation is carried out and the subprogram is terminated. The measuring device 32 is not monitored in this case.

However, if the measuring device 16 is operable, then, in a first inquiry 306, the amount of the difference of the position data values DK1 and DK2 is checked for a pregiven tolerance range. If the amount of the difference of these two measurement values is less than a pregiven threshold value A then, according to step 309, the measuring device 32 is evaluated as being operational. If the amount of this difference exceeds the pregiven value A in accordance with step 306, then, in the next step 308, a first desired value for the load value is determined on the basis of a characteristic field in dependence upon the first position data value DK1 and the engine speed and a second desired value for the load value is determined in accordance with a second characteristic field in dependence upon the second position data value DK2 and the engine speed.

In the next step 310, the amount of the difference is determined between the first desired value with reference to the load and the actual value for the load of the engine determined by the measuring device 16. If the amount of this difference drops below a pregiven value B then, according to step 312, the position data value DK2 is evaluated as being defective. If the difference drops below this pregiven threshold value B, then, in the next inquiry step 314, the difference between the second load desired value and the detected actual value is formed. If the amount of this difference exceeds a pregiven threshold value C, then, according to step 316, the position data value DK1 is evaluated as being defective. In the opposite case, and in accordance with step 318, a defect of the system is recognized when no reliable position data value is present.

After the steps 309, 312, 316 and 318, a check is made in inquiry step 320 as to whether the above-described monitoring would have as a result the condition normal in accordance with step 309. If this is the case, then, according with step 322, the control of the throttle flap on the basis of the first and/or the second position data value is undertaken and, thereafter, the subprogram terminated. If the result of the previous monitoring is not the normal state detected in the step 309, then a check is made in the inquiry step 324, which follows the step 320, as to whether the result in accordance with step 316 was a defective first position data value. If this is the case, then, in accordance with step 326, the control of the throttle flap is undertaken on the basis of the second position data value. In the opposite case, a check is made in inquiry step 328 as to whether the result in accordance with step 312 is a defect of the second position data value. If this is the case, then, in accordance with step 330, the control of the throttle flap is undertaken on the basis of the first position data value or, for the case wherein the second position data value defines a step counter, then the step counter is set to the value pregiven by the first position data value and the control of the throttle flap is carried out in accordance with step 322 as in the normal state.

If the result of the inquiry step 328 is "no" (that is, no reliable position data value according to step 318 is present), then in the next step 322, the emergency function of a control of the throttle flap described with respect to FIG. 4 is undertaken on the basis of a load desired value and a load actual value. The subprogram is terminated after the steps 322, 326, 330 and 332 and repeated at a pregiven time.

Here too, the function check can be carried out in other advantageous embodiments on the basis of position values in addition to the procedure described above which is on the basis of load values.

Also, monitoring and emergency measures can be utilized together or separately in accordance with the particular embodiment.

It is understood that the foregoing description is that of the preferred embodiments of the invention and that various changes and modifications may be made thereto without departing from the spirit and scope of the invention as defined in the appended claims.

What is claimed is:

1. An arrangement for controlling an internal combustion engine of a motor vehicle equipped with an adjusting device for making an adjustment on the engine and the motor vehicle being equipped with a driver-actuated element connected to the adjusting device with the latter being positioned in dependence upon the position of the driver-actuated element, the arrangement comprising:

electrically-actuated means for controlling the position of said adjusting device;

a first measuring device for detecting the position of said adjusting device and for outputting a variable representative of said position;

a second measuring device for detecting a first quantity indicative of the load on the engine which is not directly related to the position of said adjusting device;

fault detection means for detecting a fault in said first measuring device on the basis of said variable and said first quantity;

said fault detection means including means for converting said variable into a second quantity likewise indicative of the load of the engine; and, said fault detection means including means for comparing said first and second quantities to each other to detect a fault in said first measuring device when said first and second quantities deviate from each other by an impermissible amount.

2. An arrangement for controlling an internal combustion engine of a motor vehicle equipped with an adjusting device for making an adjustment on the engine and the motor vehicle being equipped with a driver-actuated element connected to the adjusting device with the latter being positioned in dependence upon the position of the driver-actuated element, the arrangement comprising:

electrically-actuated means for controlling the position of said adjusting device;

a first measuring device for detecting the position of said adjusting device with said position defining a first variable;

a second measuring device for detecting a second variable of the engine which is indicative of the load on the engine which is not directly related to the position of said adjusting device;

computer means for carrying out a plausibility check based on said two variables;

means for detecting a fault in the area of said first measuring device when said variables deviate from each other to an impermissible extent; and, said engine including a throttle flap and said adjusting device being said throttle flap.

3. An arrangement for controlling an internal combustion engine of a motor vehicle equipped with an adjusting device for making an adjustment on the engine and the motor vehicle being equipped with a driver-actuated element connected to the adjusting device with the latter being positioned in dependence upon the position of the driver-actuated element, the arrangement comprising:

electrically-actuated means for controlling the position of said adjusting device;

a first measuring device for detecting the position of said adjusting device and for outputting a first variable representative of said position;

a second measuring device for detecting a quantity indicative of the load on the engine which is not directly related to the position of said adjusting device;

fault detection means for detecting a fault in said first measuring device on the basis of said first variable and said quantity;

said fault detection means including means for converting said quantity into a second variable indicative of the position of said adjusting device; and, said fault detection means including means for comparing said first and second variables to each other to detect a fault in said first measuring device when said variables deviate from each other by an impermissible amount.

4. An arrangement for controlling an internal combustion engine of a motor vehicle equipped with an adjusting device for making an adjustment on the engine and the motor vehicle being equipped with a driver-actuated element connected to the adjusting device with the latter being positioned in dependence upon the position of the driver-actuated element, the arrangement comprising:

electrically-actuated means for controlling the position of said adjusting device;

a first measuring device for detecting the position of said adjusting device with said position defining a first variable;

a second measuring device for detecting a second variable of the engine which is indicative of the load on the engine which is not directly related to the position of said adjusting device;

computer means for carrying out a plausibility check based on said two variables;

means for detecting a fault in the area of said first measuring device when said variables deviate from each other to an impermissible extent;

said position of said driver-actuated element being set in response to a driver command; and, means for forming a desired value for said second variable in dependence upon said driver command and for setting said second variable into relationship to said desired value; and, said adjusting device being actuated on the basis of said desired value and the actual value for controlling said actual value to said desired value.

5. The arrangement of claim 4, wherein said electrically-actuated means is a step motor; and, said arrangement further comprising a step counter for supplying a position data value as to the position of said step motor.

6. The arrangement of claim 5, wherein, when there is an implausibility of the count of said step counter to the value which is indicative of the load, said step counter is set in at least one selected position to a value corresponding to said selected position.

7. The arrangement of claim 6, wherein the value indicative of the load is one of the following: the air mass flow, the quantity of inducted air, the air intake pressure, the load signal and the base injection time.

8. The arrangement of claim 7, further comprising means for making the plausibility check by converting the position data value with the aid of the engine speed into a measure for the engine load; and, means for thereafter checking this value to a pregiven tolerance band.

9. The arrangement of claim 7, further comprising means for making the plausibility check by converting the variable indicative of the load with the aid of the engine speed into a measure for position; and, means for checking this value to a pregiven tolerance range.

* * * * *